No. 636,104. Patented Oct. 31, 1899.
W. F. BEASLEY.
ELASTIC TIRE.
(Application filed June 24, 1899.)
(No Model.)
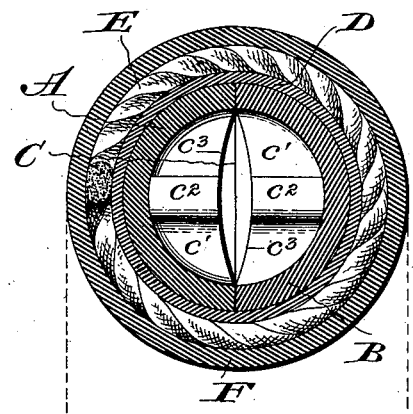
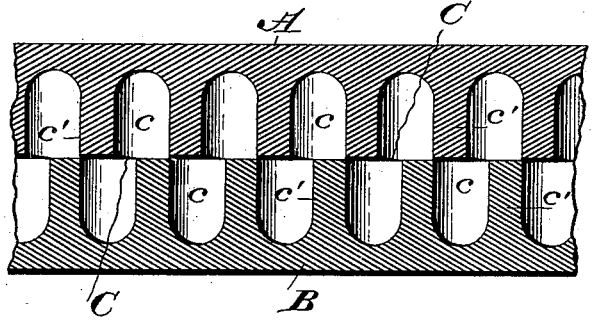
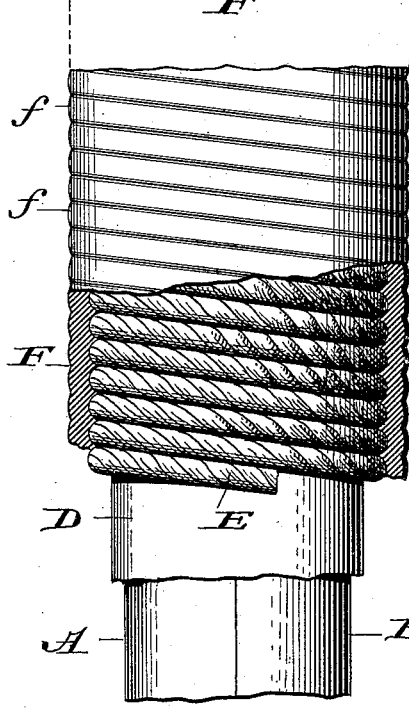
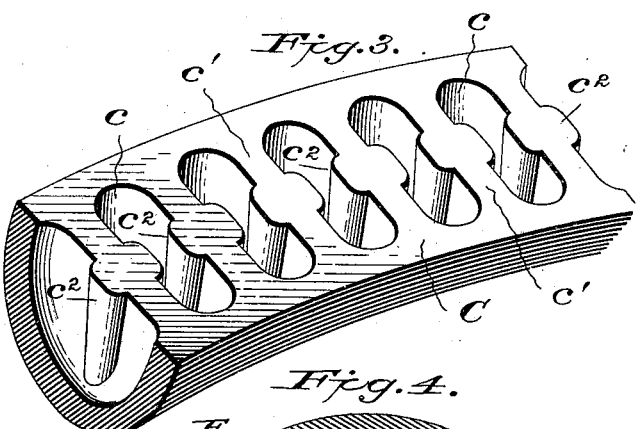
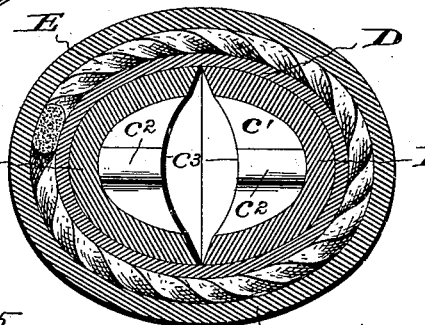
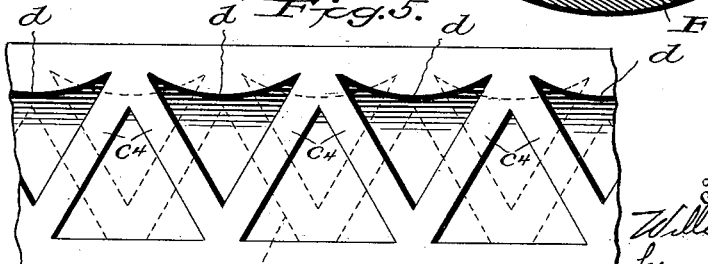
Witnesses
G. S. Elliott.
Edward Thomas Hughes.
Inventor
William F. Beasley
by
his Attorney

UNITED STATES PATENT OFFICE.

WILLIAM F. BEASLEY, OF PLYMOUTH, NORTH CAROLINA.

ELASTIC TIRE.

SPECIFICATION forming part of Letters Patent No. 636,104, dated October 31, 1899.

Application filed June 24, 1899. Serial No. 721,771. (No model.)

*To all whom it may concern:*

Be it known that I, WILLIAM F. BEASLEY, a citizen of the United States of America, and a resident of Plymouth, county of Washington, and State of North Carolina, have invented certain new and useful Improvements in Elastic Tires, of which the following is a specification.

My invention, speaking generally, relates to a tire composed of a plurality of sections arranged on opposite sides of a plane or planes at right angles to the axis of the annular ring formed by the tire, each section being unconnected to a greater or less extent with the adjoining section, whereby when pressure is placed upon the tire the several sections are free to move apart from each other, the distortion thus set up in the material of tire providing the resiliency necessary to restore the parts to normal position and affording the desired elasticity.

For the purpose of constructing a tire having the features above pointed out my invention consists in the construction, arrangement, and combination of the several parts of which it is composed, as will be hereinafter described and claimed.

Referring to the accompanying drawings, in which corresponding parts are designated by similar marks of reference, Figure 1 is a cross-section through a tire constructed in accordance with this invention. Fig. 2 is a section of the tire, taken at right angles to Fig. 1. Fig. 3 is a perspective view of a part of a tire-section. Fig. 4 is a transverse section of a tire constructed in accordance with this invention when under pressure. Fig. 5 is a section of supporting-walls inclined to each other and forming a truss-support for the tread-surface.

The resilient part of my tire is formed of a plurality of tire-sections, each of which is composed of an annular ring with a flat face in a plane parallel with the plane of revolution of the tire. In the drawings I have shown two such sections A B, each of which has a flat face in the plane of revolution of the tire, each of the sections being substantially D-shaped, the flat face thereon being diametrical to the completed tire, the flat face of one section abutting upon the corresponding face of the other section. The two sections are identical, and the following description of section A will also apply to section B.

The flat face C of the section A has formed therein a series of recesses $c$, divided from each other by means of transverse walls $c'$. The recesses afford a resiliency which would not be possessed by a solid tire, while the transverse walls afford a support for the tread of the tire when properly proportioned to the load to be sustained thereby. I prefer to make the recesses cup-shaped, as shown in the drawings, whereby the walls continuously abut upon the peripheral portion of the section A. In order to strengthen the medial portion of the walls, which are subjected to the greatest strain and which would be otherwise weakened to the greatest extent by the described configuration of the recesses, I may place strengthening-buttresses $c^3$ upon each side of each wall, the buttresses extending at right angles from the flat face $c'$.

In Fig. 5 I have shown a tire-section having transverse walls $c^4$, which are secants to the tire instead of being radial in respect thereto. By this I mean that the transverse walls are formed in the form of a truss, the corresponding ends of adjacent walls abutting each other. From this construction it follows that a compressive strain exerted upon the tire at the converging point of any two of the walls will be transmitted by the truss to the adjacent portions of the tire on each side of the point of pressure. In order to strengthen the tread-face of the tire, I place upon the inner surface thereof between the transverse walls bosses or enlargements $d$. Such a section A', as has been described, may obviously be assembled with a corresponding section in either of the ways above referred to in connection with sections A and B—that is to say, the transverse walls $c^4$ of the two sections may be caused to register or the walls may break joint in the manner shown in Fig. 2 and as is indicated in dotted lines at $c^5$ in Fig. 5. In the latter case it is obvious that the bosses $d$ upon one section will bear against the tread ends of the transverse walls of the other section and support them against collapse. It is also obvious that in such a case the walls $d$ may be duplicated on the rim side of the tire.

The sections may be made by any desired process; but I prefer to make them in suitable molds and to vulcanize them to a greater or less extent before removing them therefrom.

Two sections A and B having been brought together, I wrap around them a strip D of rubber or other suitable material, by which the two sections are secured to each other at the circumferential portions of the diametrical abutting faces C C. It will be seen that the central portion of these diametrical faces are in no way united to each other by the wrapper D, and thus result the advantages hereinafter referred to.

I do not desire to limit myself to the described wrapper D as the means for securing together the circumferential portions of the abutting faces, for the said portions of such faces may be wholly or partly united by the vulcanization to which the otherwise completed tire is subjected, as will be hereinafter stated. However, if the condition of the tire-sections is such when brought together as to permit the vulcanizing above referred to it is necessary to provide means for preventing the adhering of the central portion of the diametrical faces C. This may be done by so disposing the two tire-sections A B in relation to each other that the transverse walls $c'$ of one section come opposite a recess $c$ in the other section, as shown in Fig. 2. This prevents the registration of the transverse walls, and to this extent I consider it objectionable, and I therefore prefer to prevent the vulcanization together of the central portion of the abutting faces by preventing the direct contact of one transverse wall of one section with the registering transverse wall of the other section. This may be done by slightly dishing the face of the transverse walls, as shown at $c^3$, Fig. 1. The face C of such tire-section is still a "flat" face in the meaning of that name as used here, as the circumferential portions of the face C are in the same plane.

The wrapper D is further reinforced by a suitable supplemental winding, as will be hereinafter described, and the elastic action of my improved tire may be briefly stated as follows: The weight transmitted to the tread-face of the tire forces the latter toward the rim, and the circumferential portion of the abutting faces of the two sections being fastened together, the central portions thereof being unconnected, the tire assumes an elliptical form, the minor axes of the ellipse coinciding with the line of pressure. This results in a separation between the two sections, as shown in Fig. 4, and this tendency is resisted not only by the transverse walls and the material of the tire, but by the windings hereinafter described, all of which coöperate in restoring the tire to normal configuration.

From the above it follows that a casing of considerable strength and durability is required in connection with such a tire, and I have therefore devised the following form of winding for use therewith; but I do not wish to limit this feature of my invention to use with any specific form of rubber tire, as the same is applicable to any tire where considerable strains are to be resisted, the parts being properly proportioned to the work they have to do. According to this feature of my invention, around the wrapping D, I wind a layer E of strong cord or rope suitably impregnated with unvulcanized rubber or having unvulcanized rubber worked therein, so that in the subsequent vulcanization of the tire the several strands of the rope will become thoroughly adherent to each other, whereby raveling will be prevented. For a tire for an automobile-vehicle, such as now in common use in many cities of the United States, I would suggest the use of a cord or rope for this winding having a diameter of about one centimeter. Over this winding is placed the usual wearing-surface of rubber F, and the whole tire is then subjected to vulcanization, the surface F being so placed upon the tire as not to entirely obliterate the corrugations produced by the cord winding, so that the said surface of the tire is formed with a series of ridges $f$, extending transversely across it, which prior to my invention have been produced in other ways. It will thus be seen that not only does the cord winding hereinbefore described result in a tire-casing of unusual strength, but that it lends itself to the production of the ridged tread-face, which is not true of a winding in the form of flat ribbon.

From the above it will be seen that I have constructed a tire that can be cheaply made without expensive appliances or machinery and which is strong and durable and which contains no parts which cannot be easily molded or formed.

Having thus described my invention, what I claim as my invention, and desire to secure by Letters Patent, is—

1. A tire comprising a plurality of separate sections, separated in the plane of revolution of the tire, the circumferential portions of the said sections being connected together, and the central portions of the said sections being unconnected, substantially as described.

2. A tire comprising a plurality of separate sections, separated in the plane of revolution of the tire, the circumferential portions of the said sections being connected together and the central portions of the said sections being unconnected, and a casing surrounding the said sections and supporting them against undue separation, substantially as described.

3. A tire comprising a plurality of separate sections, having faces abutting in the plane of revolution of the tire, each section being provided with recesses in its abutting face separated by transverse supporting-walls the circumferential portions of the said sections being connected together, and the transverse walls of the sections being unconnected, substantially as described.

4. A tire comprising a plurality of separate sections, having faces abutting in the plane of revolution of the tire, each section being provided with recesses in its abutting face separated by transverse supporting-walls, the circumferential portions of the said sections being connected together, and the transverse walls of the sections being unconnected, and a casing surrounding the said sections and supporting them against undue separation, substantially as described.

5. A tire comprising a plurality of separate sections having faces abutting in the plane of revolution of the tire, each section being provided with recesses in its abutting face separated by transverse supporting-walls, the circumferential portions of the said sections being connected together, and the transverse walls of the said sections being unconnected but registering with each other, substantially as described.

6. A tire comprising a plurality of separate sections having faces abutting in the plane of revolution of the tire, each section being provided with recesses in its abutting face separated by transverse supporting-walls, the circumferential portions of the said section being unconnected but registering with each other, and a casing surrounding the said sections and supporting them against undue separation, substantially as described.

7. A tire comprising a plurality of separate sections, having faces abutting in the plane of revolution of the tire, each section being provided with recesses in its abutting face separated by transverse supporting-walls with dished ends, the circumferential portions of the sections being connected together, and the transverse walls of the section being unconnected but registering with each other, substantially as described.

8. A tire comprising a plurality of separate sections having faces abutting in the plane of revolution of the tire, each tire being provided with recesses in its abutting face separated by transverse supporting-walls with dished ends, the circumferential portion of one section being vulcanized to the corresponding portion of the other section, and the transverse walls of the sections registering with and separated from each other, substantially as described.

9. The combination in a tire of a resilient section, a winding therefor composed of rope, and a tread-section laid upon the rope winding and conforming to the outline of the winding whereby a riged tread is produced, substantially as described.

10. A resilient tire composed of a cover inclosing a series of transverse supporting-walls, the walls extending from the rim side to the tread side of the cover, each of the corresponding ends of each wall abutting upon the corresponding end of one of the adjoining walls, substantially as described.

11. A cellular tire having its interior divided by transverse walls arranged as secants to the tire, and extending from the rim-face to the tread-face thereof, each of the two ends of each wall bearing upon the corresponding end of an adjoining wall, whereby a truss is formed extending continuously around the tire, substantially as described.

12. A tire composed of two sections divided in the plane of revolution of the tire, each section being provided with transverse supporting-walls, the ends of each wall of each section abutting upon the corresponding ends of an adjoining wall of the same section, substantially as described.

13. A tire composed of two sections divided in the plane of revolution of the tire, each section being provided with transverse supporting-walls, each of the ends of each wall of each section abutting upon the corresponding end of an adjoining wall, and the walls of the two sections being staggered in relation with each other, substantially as described.

Signed by me, at Washington, District of Columbia, this 16th day of June, 1899.

WILLIAM F. BEASLEY.

Witnesses:
VERNON M. DORSEY,
EDWARD THOMAS HUGHES.